US009821289B2

United States Patent
Asano et al.

(10) Patent No.: US 9,821,289 B2
(45) Date of Patent: Nov. 21, 2017

(54) MICROREACTOR FOR PHOTOREACTIONS (71) Applicant: HITACHI, LTD., Tokyo (JP)

(72) Inventors: Yukako Asano, Tokyo (JP); Shigenori Togashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 14/870,786

(22) Filed: Sep. 30, 2015

(65) Prior Publication Data

US 2016/0016141 A1    Jan. 21, 2016

Related U.S. Application Data (62) Division of application No. 14/114,389, filed as application No. PCT/JP2011/061112 on May 13, 2011, now Pat. No. 9,370,760.

(51) Int. Cl.
*B01J 19/00* (2006.01)
*B01J 19/12* (2006.01)

(52) U.S. Cl.
CPC ......... *B01J 19/0093* (2013.01); *B01J 19/122* (2013.01); *B01J 2219/00792* (2013.01); *B01J 2219/00806* (2013.01); *B01J 2219/00808* (2013.01); *B01J 2219/00819* (2013.01); *B01J 2219/00831* (2013.01); *B01J 2219/00867* (2013.01); *B01J 2219/00873* (2013.01); *B01J 2219/00934* (2013.01)

(58) Field of Classification Search
None
See application file for complete search history.

(56) References Cited

U.S. PATENT DOCUMENTS

2006/0034736 A1    2/2006   Miura et al.
2008/0135397 A1    6/2008   Ehrfeld et al.

FOREIGN PATENT DOCUMENTS

| CN | 101146605 A | 3/2008 |
|---|---|---|
| DE | 10209898 | * 9/2003 |
| DE | 10209898 A1 | 9/2003 |
| EP | 1385006 A2 | 1/2004 |
| JP | 2005-091093 A | 4/2005 |
| JP | 2005091169 A | 4/2005 |
| JP | 2006-051409 A | 2/2006 |

(Continued)

OTHER PUBLICATIONS

Microreactor Sales Division of YMC Co., LTD., "Microreactor photoreaction device", [online], (Feb. 16, Heisei 23 (2012)), Internet <http://www.keyboardchemistry.com/pdf/lumino099281_66.pdf>.

(Continued)

*Primary Examiner* — Kishor Mayekar
(74) *Attorney, Agent, or Firm* — Mattingly & Malur, PC (57) ABSTRACT A microreactor for photoreactions includes a housing upper part, a lid plate made of a material that allows transmission of light, a flow path plate made of a material that suppresses light reflection and has a high thermal conductivity, and a housing lower part. Light is applied through a window of the housing upper part and the lid plate to a flow path of the flow path plate. The lid plate made of the material that allows transmission of light and the flow path plate made of the material that suppresses light reflection and has a high thermal conductivity are welded each other to form an integrated body.

5 Claims, 6 Drawing Sheets (56) References Cited

FOREIGN PATENT DOCUMENTS

| JP | 2007-038058 A | 2/2007 |
| JP | 2007-071608 A | 3/2007 |
| JP | 2007-075682 A | 3/2007 |
| JP | 2008-238090 A | 10/2008 |
| JP | 4485206 B2 | 4/2010 |
| WO | 03/066212 A2 | 8/2003 |
| WO | 2004/076056 A2 | 9/2004 |
| WO | 2008/132309 A2 | 11/2008 |
| WO | 2008/153119 A1 | 12/2008 |

OTHER PUBLICATIONS

International Preliminary Report on Patentability received in International Application No. PCT/JP2011/061112 dated Nov. 28, 2013.
European Search Report received in corresponding European Application No. 11865894 dated Dec. 12, 2014.
H. Habuka et al., "Heat Transport Analysis for Flash Lamp Annealing", Japanese Journal of Applied Physics, vol. 46, No. 3A, 2007, pp. 937-942.
E.W. Spisz et al., "Solar absorptances and spectral reflectances of 12 metals for temperatures ranging from 300 to 500 K", NASA technical note, Aug. 1969, pp. 1-22, Lewis Research Center, Cleveland, Ohio.
Chinese Office Action received in corresponding Chinese Application No. 201180070787 dated Jul. 9, 2014.
Japanese Office Action received in corresponding Japanese Application No. 2013-514875 dated Aug. 26, 2014.

\* cited by examiner

IRRADIATION LIGHT

MICROREACTOR FOR PHOTOREACTIONS

CROSS-REFERENCE TO RELATED APPLICATION

This application is a divisional application of U.S. application Ser. No. 14/114,389, filed Oct. 28, 2013, the entirety of the contents and subject matter of all of the above is incorporated herein by reference.

TECHNICAL FIELD

The present invention relates to a microreactor for photoreactions to proceed reactions by utilizing light energy.

BACKGROUND ART

In recent years, applying equipment of mixing fluids in a micro flow path manufactured by micro fabrication techniques, so-called a microreactor, to biochemistry, medical field or the field of chemical reactions has been performed vigorously. One of chemical reactions, a photoreaction of proceeding a reaction by utilizing light energy (a photochemical reaction) has been known.

As a feature of the photoreaction in the microreactor, it has been known that the efficiency of the photoreaction is improved extremely since light from a light source easily reaches the lowest portion of a fluid due to reduction in the size of a reaction space to enable uniform light irradiation.

Accordingly, it is expected that the reaction in which the efficiency of the photoreaction is lowered by a usual batch method can also be performed easily at a high efficiency by the microreactor.

For the microreactor proceeding the photoreaction, various developments and studies have been made so far.

At first, a microreactor having a reaction part formed of a tubular light transmitting flow path and a light source part having alight source causing photoreactions has been known (for example, refer to Patent Document 1).

Secondly, it has been known a microreactor for photoreactions in which a channel is formed on a planar substrate made of SUS316 as a stainless steel or made of PTFE (polytetrafluoroethylene), and a flow path is formed by a cover made of quartz glass (for example, refer to Non-Patent Document 1).

Thirdly, with an aim of increasing the sensitivity of detection values, a method of reflecting light for multiple times by devising the structure of flow paths has been known (for example, refer to Patent Documents 2, 3).

Fourthly, with an aim of improving the accuracy and the separation in the synthesis of DNA microarrays, there has been known a method of using a material having a diffractive index identical with that of a fluid, or providing an anti-reflection film (for example, refer to Patent Document 4), and a method of using an anti-reflection film or providing a light absorption layer coated with a spray coating material opposing to an irradiation/detection part with an aim of increasing the sensitivity of detection values (for example, refer to Patent Document 5).

PRIOR ART DOCUMENTS

Patent Document

Patent Document 1:
JP2007-75682A
Patent Document 2:
JP2005-91093A
Patent Document 3:
JP2005-91169A
Patent Document 4:
JP4485206B2
Patent Document 5:
JP2007-71608A

Non-Patent Document

Non-Patent Document 1:
"Microreactor photoreaction device", [online], microreactor sales division of YMC Co., Ltd., (February 16, Heisei 23 (2012)), Internet <http://www.keyboardchemistry.com/pdf/lumino099281_66.pdf>

SUMMARY OF THE INVENTION

Problem to be Solved by the Invention

When a tubular light transmitting flow path is used as the technique described in the Patent Document 1, since light radiates radially, a cover should be provided at the periphery for the safety. Depending on the material of the cover, the reflection light is utilized.

Further, when a microreactor on a planar substrate is used and a substrate made of SUS316 is used as the technique described in the Non-patent Document 1, the reflection light is utilized. When a substrate made of PTFE is used, while the reflection light is suppressed, this involves a problem that temperature control is difficult since the thermal conductivity is low.

Problems in the case of utilizing the reflection light as the techniques described in the Non-patent Document 1 and the Patent Documents 2, 3 are to be described below.

When the reflection light is utilized, the wavelength of the reflection light depends on the material of the reflection surface and the state of the surface such as the shape of the reflection surface. When a light at a specific wavelength is reflected by devising the structure of the flow paths, fabrication error also gives an effect on the wavelength.

Accordingly, when the wavelength of a light emitting from the light source is not identical with the wavelength of the reflection light and a light at the wavelength that may cause side reactions is amplified, this results in lowering of the yield. Further, when the surfaces of the flow paths are changed along with the lapse of time depending on a cleaning method, etc., the reproducibility cannot be obtained for the result.

Further, when the reflection light reaches the light source, the light source is heated by the reflection light. It has been known that the intensity of the emitting light and the wavelength range of the light from the light source are changed depending on the temperature.

As a result that the light source is heated by the reflection light, the wavelength of the light used for the reactions becomes unconstant. Accordingly, when an experiment is conducted for a long time, no reproducibility can be obtained, which results in lowering of the yield.

On the other hand, when a reflection light is suppressed by the anti-reflection film, etc. as the technique described in the Patent Documents 4 and 5, the energy of the light that is absorbed without reflection is converted into heat. Since the thermal conductivity of the anti-reflection film is low, the generated heat is accumulated on the anti-reflection film to change the temperature of the system.

Further, also in a case where an air layer is present between an anti-reflection film and a substrate, since the thermal conductivity of air is low, heat is not dissipated effectively and the temperature of the system increases to bring about a problem that the yield is lowered when the reaction rate of the side reaction has high temperature dependence.

An object of the present invention is to realize a microreactor for photoreactions capable of suppressing a reflection light without using an anti-reflection film, having high thermal conductivity, and capable of improving the reproducibility of a product to be obtained.

Means for Solving the Problems

For attaining the foregoing object, the present invention is configured as described below.

A microreactor for phtoreactions to proceed a photoreaction of a reactant (s) comprises a flow path plate on which a flow path for passing a reactant (s) is formed, and the flow path plate is made of a material having high thermal conductivity and suppressing light reflection.

Further, the microreactor comprises a penetration pass plate on which a flow path for passing a reactant(s) is formed and the penetration pass plate is made of a material allowing transmission of light, and the microreactor comprises a bottom plate secured to the penetration flow path plate, and the bottom plate is made of a material having high thermal conductivity and suppressing light reflection.

Effects of the Invention

The present invention can realize a microreactor for photoreactions capable of suppressing light reflection without using an anti-reflection film, having high thermal conductivity, and capable of improving the reproducibility of a product to be obtained.

MODE FOR CARRYING OUT THE INVENTION

Embodiments of the present invention are to be described with reference to the accompanying drawings.

First Embodiment

Figure 1:
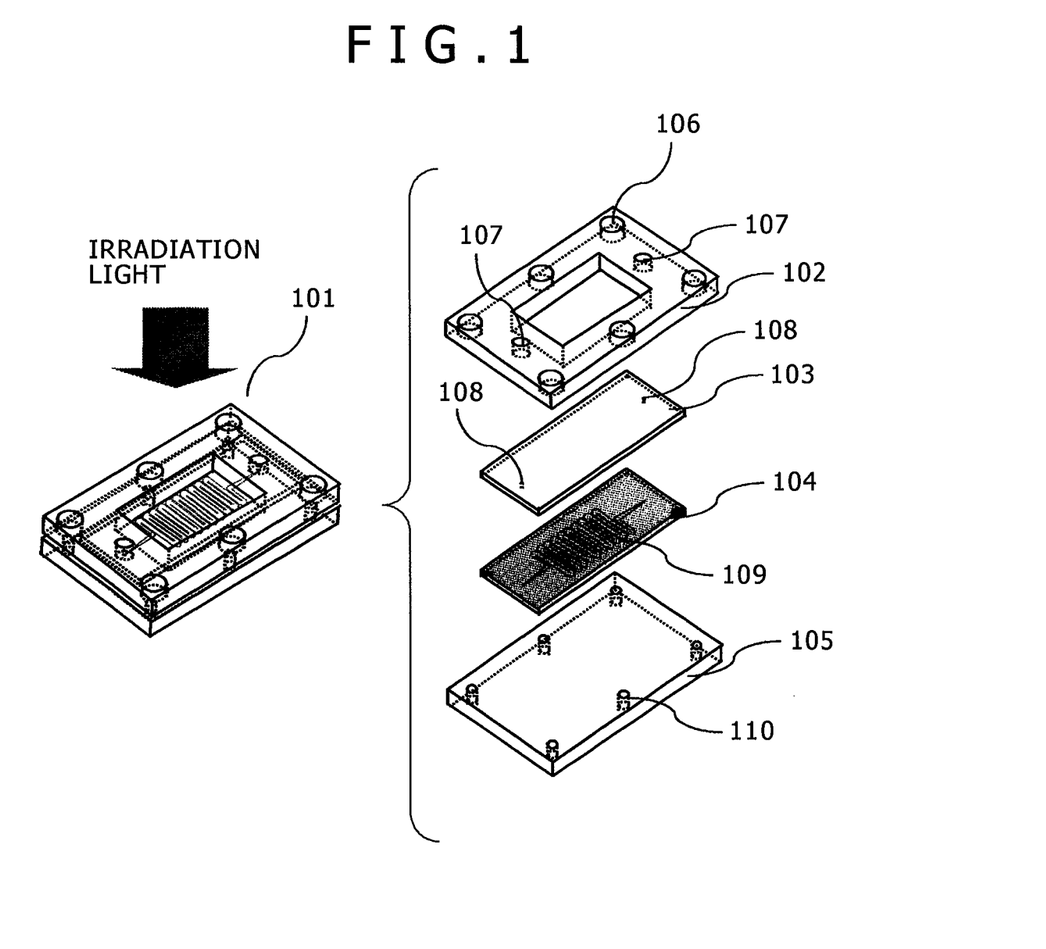
FIG. 1 illustrates an appearance and an exploded perspective view of a microreactor for photoreactions according to a first embodiment of the invention.

FIG. 1 illustrates an appearance and an exploded perspective view of a microreactor for photoreactions according to a first embodiment of the invention.

In FIG. 1, a microreactor for photoreactions 101 includes a housing upper part 102, a lid plate 103 made of a material allowing transmission of light, a flow path plate 104 made of a material suppressing light reflection and having high thermal conductivity, and a housing lower part 105. The housing upper part 102 has a window formed in the central portion and has a shape of a window frame. Light is applied by way of the window and the lid plate 103 made of a light transmitting material to a flow path 109 of the flow path plate 104.

Examples of the size for the housing upper part 102, the lid plate 103, the flow path plate 104, and the housing lower part 105 are shown below. However, the sizes shown below can be changed optionally while considering the convenience of use, etc.

The entire size of the housing upper part 102 is 80 mm length×50 mm width×5 mm height and the size of the window is 40 mm length×22 mm width. The entire size of the lid plate 103 is 70 mm length×28 mm width×1 mm height. The entire size of the flow path plate 104 is 70 mm length×28 mm width×1.4 mm height. The depth of the flow path is 0.2 mm. Further, the entire size of the housing lower part 105 is 80 mm×50 mm width×5 mm height.

Fluid gateways 108 are formed at two positions of the lid plate 103 vertically penetrating the plate 103. The flow path 109 is formed in the flow path plate 104. Both ends of the flow path 109 form a fluid inlet and a fluid exit. The lid plate 103 and the flow path plate 104 are secured (preferably welded) to each other to form an integral plate, in which the two fluid gateways 108 and both ends of the flow path 109 are aligned each other so as to pass the fluid.

A fluid as a reactant(s) introduced from one fluid gateway 108 of the lid plate 103 passes through the flow path 109 and is discharged from the other fluid gateway 108. The lid plate 103 is made of a material allowing transmission of light. Accordingly, when a light is applied from the upper surface of the lid plate 103 and allowed to transmit through a fluid flowing in the flow path 109, a photoreaction proceeds in the fluid during passage of the fluid as a reactant(s) through the flow path 109.

Further, the lid plate 103 and the flow path plate 104 are sandwiched between the housing upper part 102 and the housing lower part 105 and secured by means of screws (not illustrated) through the threaded holes 106 formed in the housing upper part 102 and the threaded holes 110 formed in the housing lower part 105.

Figure 4:
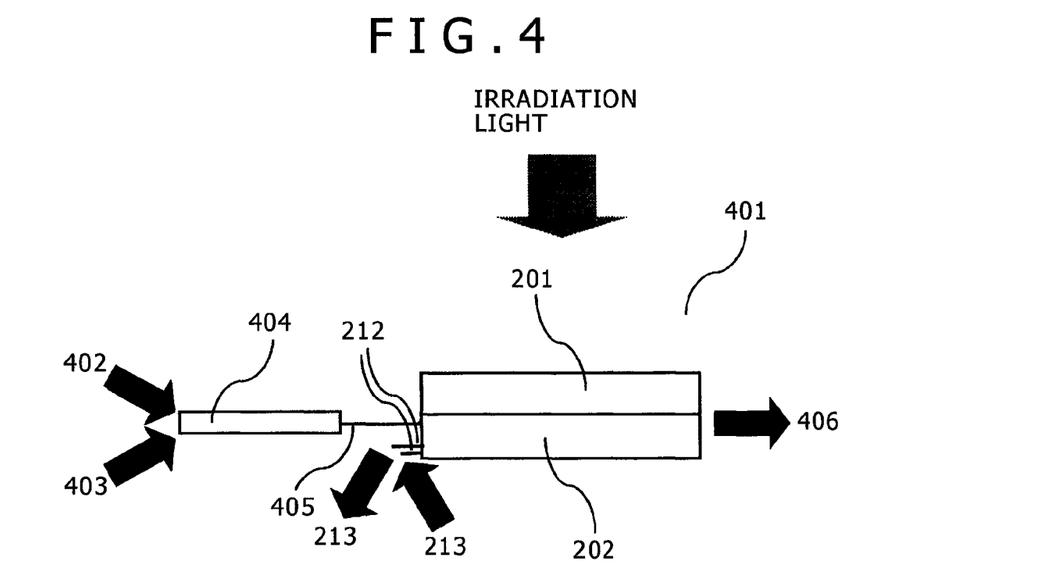
FIG. 4 is an explanatory view of a microreactor device for photoreactions using the microreactor for photoreactions, the light source module, and the temperature control module in FIG. 2.

Further, the threaded holes for fitting are formed as the tube connection portions (fluid inlet port and fluid exit port) 107 in the housing upper part 102 and a tube (connection tube 405 as shown in FIG. 4) can be connected directly to the fluid gateway 108 of the lid plate 103 by using a fluid bottom fitting (not illustrated).

The lid plate 103 made of a material allowing transmission of light and the flow path plate 104 made of a material suppressing light reflection and having high thermal conductivity are welded and integrated to each other but the invention is not restricted to such configuration and other configurations are also applicable. For example, the lid plate 103 and the flow path plate 104 can be brought into close contact to form a flow path by forming a packing groove to one of the plates opposing each other by using a packing and putting the lid plate 103 and the flow path plate 104 between the housing upper part 102 and the housing lower part 105.

Alternatively, the flow path can be formed only by the lid plate 103 and the flow path plate 104 without using the housing upper part 102 and the housing lower part 105 by forming threaded holes to the lid plate 103 and the flow path plate 104, forming a packing groove to one of the plates 103 and 104 opposed with each other, and using a packing.

The material of the housing upper part 102 and the housing lower part 105 can be changed optionally so long as the material is not in direct contact with the reaction solution. For example, stainless steel, silicon, hastelloy, silicon resin, fluoro resin, and engineering plastics, etc. can be used as a material of the housing upper part 102 and the housing lower part 105.

However, it is preferred to form the material, particularly, for the housing lower part 105 with a metal from a view point of thermal conductivity. Both of the material of the housing upper part 102 and the material of the housing lower part 105 are preferably made of metals from a view point of ensuring the strength.

For obtaining the advantageous effect of a microreactor for photoreactions, the depth of the flow path 109 formed in the flow path plate 104 is preferably less than or equal to several mm, and more preferably, within a range from several tens μm to 1 mm. With such a configuration, a light transmitting the lid plate 103 made of a material that allows transmission of light can reach as far as the bottom of the lowest portion of the flow path 109. On the other hand, the flow path width of the flow path 109 is preferably as large as possible. This is because a light irradiation area can be ensured and, in addition, the time of photoreactions by light can also be ensured with such a configuration.

While the flow path 109 is a flow path through which one kind of a fluid is introduced, it may also have a shape of a flow path where two or more kinds of fluids are mixed such as a Y-shape or a T-shape, etc. configuration.

However, when two or more kinds of fluids are introduced, since side reaction may be possibly caused if the fluids are irradiated by light in a state where mixing is still insufficient. Therefore, it is preferred that they are previously mixed into a single fluid and then introduced into the microreactor for photoreactions. A configuration of a device of previously mixing two or more kinds of fluids is to be described later with reference to FIG. 4.

The material of the lid plate 103 made of a material allowing transmission of light can be optionally changed depending on the type of the reaction so long as the material allows transmission of light and gives no undesired effect on the reaction. For example, glass, quartz glass, Pyrex (registered trademark) glass, and transparent ceramics, etc. can be used.

Further, the material of the flow path plate 104 made of a material suppressing light reflection and having high thermal conductivity can be changed optionally in accordance with the type of reactions so long as the material suppresses the light reflection and has a high thermal conductivity. For example, black alumina (reflectance of 5.1% to 15.3% at a wavelength of 240 to 2600 nm, thermal conductivity of 31.2 W/(m·K), etc. can be used.

When glass such as quartz glass and Pyrex (registered trademark) glass is used as the material of the lid plate 103 and the flow path plate 104, since the thermal conductivity is as low as about 1 W/(m·K), the reaction of heat generated by reaction(s) is not dissipated effectively.

Further, in a case where light is absorbed in the course of light transmission and the light energy is converted into heat, the heat is not also dissipated effectively.

Accordingly, with a view point of heat removal, it is preferred that the material of the lid plate 103 and the reaction plate 104 has a thermal conductivity about that of metal, that is, about 10 W/(m·K) or more.

On the other hand, the thermal conductivity of transparent ceramics (transparent sapphire) is 41 W/(m·K). Further, it has been known that the thermal conductivity of black alumina is 12 to 31 W/(m·K), and more heat removing effect can be expected compared with glass such as conventional glass and Pyrex (registered trademark) glass.

The lid plate 103 made of transparent sapphire and the flow path plate 104 made of black alumina are prepared by placing powders (raw material (s)) into a mold and forming them by a heat treatment at high temperature (sintering).

However, it has been known that the appropriate manufacturing method is different depending on the kind of ceramics and, in addition to the method described above, a dry molding method typically represented by a pressure molding method of placing powders (materials) into a mold and pressurizing them, a plastic molding method, a casting molding method, and a tape molding method can also be used.

Figure 2:
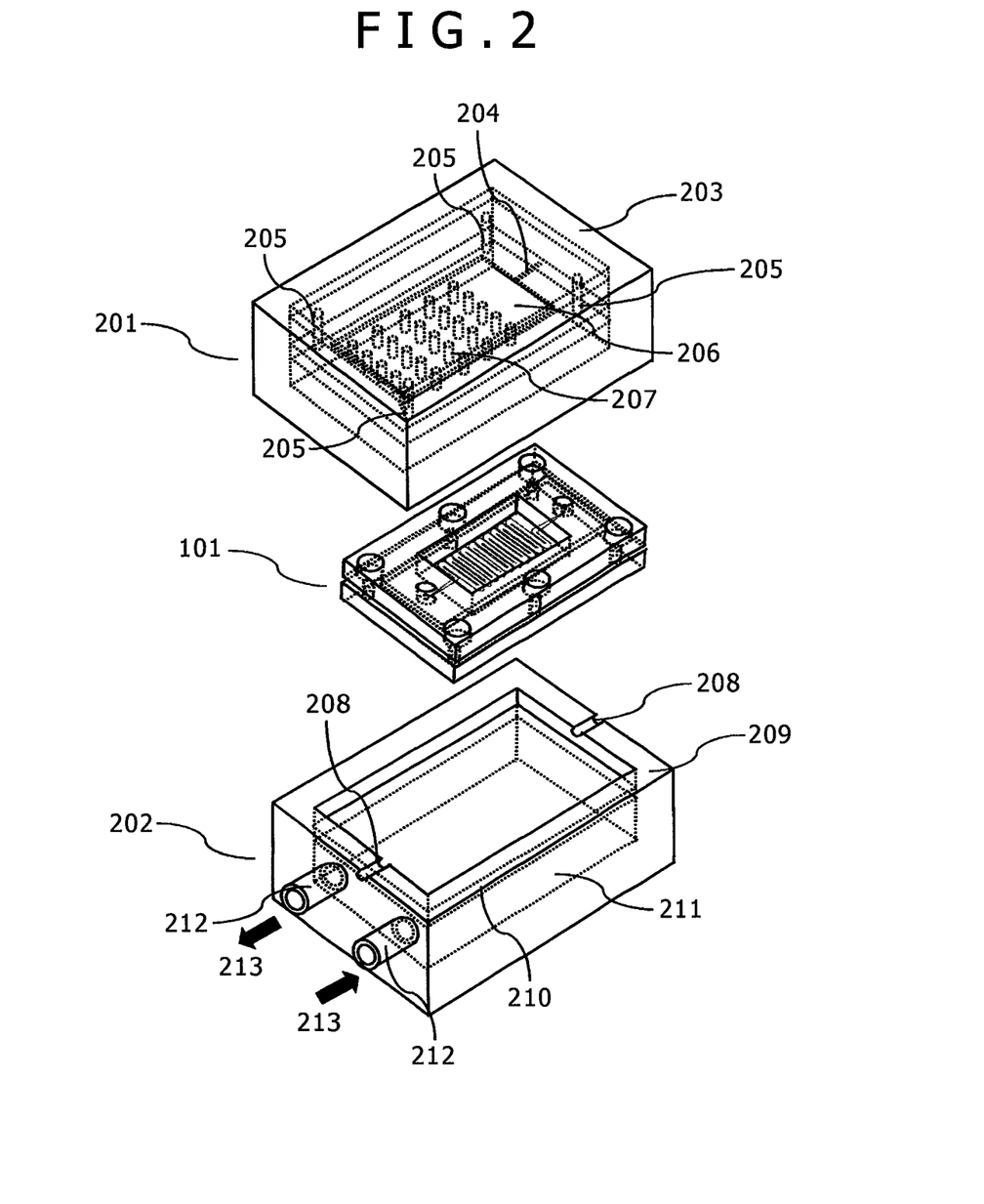
FIG. 2 is an exploded view of a microreactor device for photoreactions having a microreactor unit for photoreactions including a microreactor for photoreactions, alight source module, and a temperature control module in combination according to the first embodiment of the invention.
Figure 3:
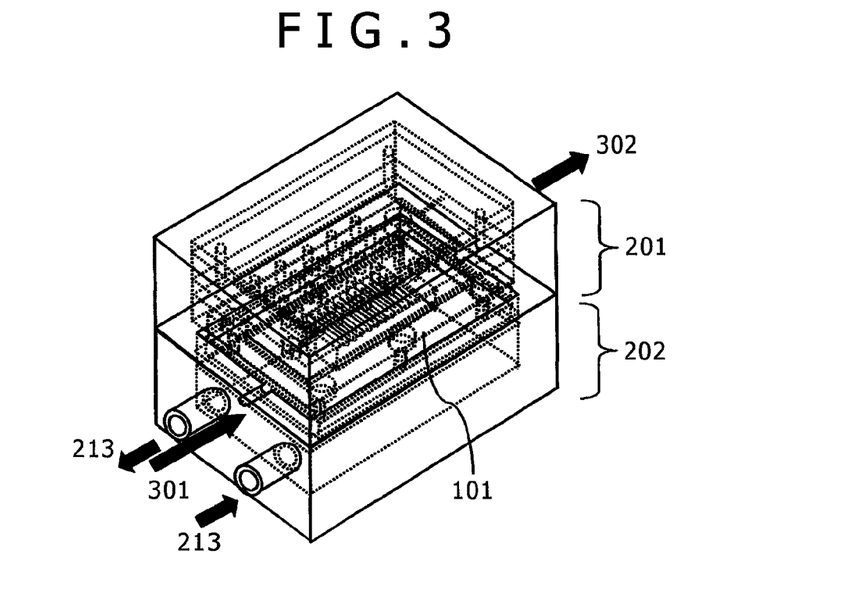
FIG. 3 is a perspective view of a microreactor device for photoreactions according to the first embodiment of the invention.

FIG. 2 is an exploded view of a microreactor device for photoreactions having a microreactor for photoreactions unit including the microreactor for photoreactions 101 illustrated in FIG. 1, alight source module 201, and a temperature control module 202 in combination and FIG. 3 is a perspective view of the microreactor device for photoreactions illustrated in FIG. 2.

In FIG. 2 and FIG. 3, the light source module 201 has a substrate 206 to which a light source 207 for irradiation of the microreactor for photoreactions with light and a power supply part 204 are attached, and a case 203 made of a heat insulation material in which the substrate 206 is accommodated, and pins 205 for preventing the substrate 206 from directly contacting to the case 203.

The temperature control module 202 has a heat conduction plate 210, a circulating fluid circulation part 211 and a case 209 made of a heat insulation material for accommodating them. In the case 209, the microreactor for photoreactions 101 can be accommodated on the heat conduction plate 210.

Further, tube lead out ports (fluid inlet port, fluid exit port) 208 are formed to the case 209, and tubes connected to the tube connection parts 107 of the housing upper part 102 of the microreactor for photoreactions 101 can be led out of the tube lead out ports 208. Then, a fluid 301 as a raw material(s) (a reactant(s)) is introduced through the tube connected to the tube lead out port 208 into the microreactor for photoreactions 101 in which the reaction is proceeded by light to form a product 302, which is discharged through the tube connected to the tube lead out port 208.

Further, circulating fluid gateways 212 are formed to the case 209 and a circulating fluid (heat medium) 213 discharged from the outside of a circulation thermostat bath, etc. is introduced from one of circulating fluid gateways 212 and then discharged through the circulating fluid circulation part 211 from the other of the circulating fluid gateways 212.

The circulating fluid circulation part 211 is kept at a predetermined temperature by the circulation fluid (thermal medium) 213, transfers heat relative to the microreactor for photoreactions 101 through the heat conduction plate 210 and can control the temperature of the microreactor for photoreactions 101.

A cooling device such as a cooling blower, etc. may be provided to the light source module 201 for stabilizing the light source 207. Further, in a case where the reaction temperature used is about a normal temperature, the heat insulation material may not always be used as the material of the case 203 surrounding the substrate 206. However, when the temperature control module 202 is combined with the light source module 201, the temperature of the microreactor for photoreactions 101 can be controlled effectively by using the heat insulation material as the material of the case 203.

Further, a non-conductive material is used preferably for the case 203 for preventing short circuit or electric shock, etc. that may possibly occur if the substrate 206 or the power supply part 204 is in contact with the case 203.

The kind of the light source 207 can be optionally changed in accordance with the wavelength and the intensity of light necessary for proceeding the reaction of fluid in the microreactor for photoreactions 101. For example, a LED lamp, a mercury lamp, an incandescent bulb, an infrared ray bulb, and a far infrared lamp, etc. can be used.

The kind of the circulating fluid (heat medium) 213 can be changed optionally depending on the reaction temperature intended to be set. For example, water, water-ethanol mixed solvent, ethylene glycol, etc. can be used. Further, when the reaction temperature is a room temperature, since a material of high thermal conductivity is used for the flow path plate 104, the circulating fluid 213 may not always be necessary depending on the heat caused by light absorption and the heat of reaction.

Further, since heat is transferred through the heat conduction plate 210 between the microreactor for photoreactions and the circulating fluid circulation part 211, the heat generated by absorption of light in the flow path plate 104 can be utilized efficiently as a heat source for heating when heating by the circulating fluid (heat medium) 213 is necessary.

The material of the heat conduction plate 210 can be changed optionally in accordance with the thermal conductivity and the property of the circulating fluid (heat medium) 213. For example, aluminum, stainless steel, silicon, hastelloy, etc. can be used and a material having higher thermal conductivity is preferred in order to provide an intended effect as the heat conduction plate.

FIG. 4 illustrates a microreactor device for photoreactions using the microreactor for photoreactions, the light source module, and the temperature control module in FIG. 2 and illustrates an example of previously mixing two kinds of raw materials (reactants).

In FIG. 4, a microreactor system for photoreactions 401 has a microreactor for mixing 404, a light source module 201, a temperature control module 202, a microreactor for photoreactions 101 arranged between the light source module 201 and the temperature control module 202, and a connection tube 405 for connecting the microreactor for mixing 404 and the microreactor for photoreactions 101.

The microreactor for mixing 404 has a configuration having two raw material inlets, and mixing the raw materials entered from the two raw material (reactant) inlets and discharging them from the exit.

A first raw material (reactant) 402 and a second raw material (reactant) 403 are introduced into the microreactor for mixing 404 and mixed in the flow path inside the microreactor for mixing 404. Then, the raw materials mixed in the microreactor for mixing 404 are introduced through the connection tube 405 to the microreactor for photoreactions 101. A photoreaction proceeds inside the microreactor for photoreactions 101 by light irradiation during passage of the raw materials through the flow path to produce a product 406.

The first raw material (reactant) 402, the second raw material (reactant) 403, and the circulating fluid (heat medium) 213 are introduced by some or other fluid feeding means to the temperature control module 202. For example, a syringe pump, a manual syringe, a plunger pump, a diaphragm pump, a screw pump, etc. can be used as the fluid feeding means. A fluid feeding means that utilizes water head difference may also be used.

The material of the connection tube 405 can be changed optionally in accordance with the temperature and the property of the solution flowing in the tube 405 so long as it does not give any undesired effect on the reaction of the solution. For example, stainless steel, silicon, glass, hastelloy, silicon resin, and fluoro resin, etc. can be used. Further, materials improved for corrosion resistance such as glass lining, nickel or gold coating applied on the surface of stainless steel, silicon, etc. or silicon oxidized at the surface can also be used.

Further, while two kinds of raw materials (reactants) are mixed in the microreactor for mixing 401, three or more kinds of raw materials may also be mixed. When the three kinds of raw materials are previously mixed, a microreactor for mixing having a flow path that mixes the three kinds of raw materials may be provided instead of the microreactor for mixing 404, or the microreactor for mixing 404 for mixing two kinds of raw materials may be serially connected in plurality thereby mixing the raw materials successively to mix desired kinds (numbers) of raw materials.

Further, a product obtained through the microreactor for photoreactions 101 can be used for the first raw material (reactant) 402, the second raw material (reactant) 403, or both of them. Further, the raw materials may be mixed homogeneously or inhomogeneously (in the so-called emulsion state).

Figure 5:
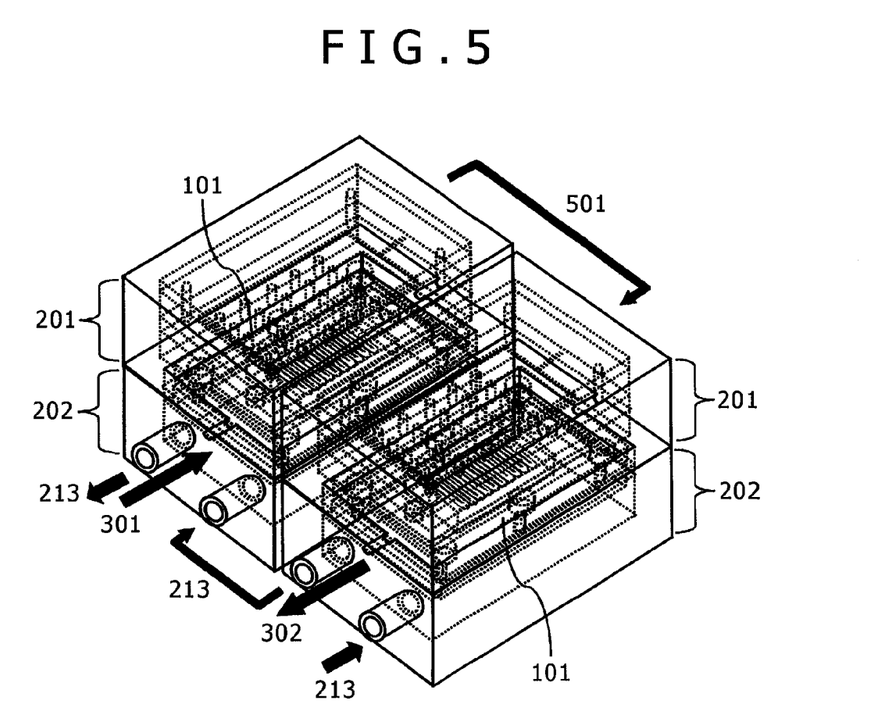
FIG. 5 is a view illustrating a microreactor device for photoreactions when two microreactor units for photoreactions illustrated in FIG. 2 are used.

FIG. 5 is a view illustrating a microreactor device for photoreactions using two sets of the microreactor units for photoreactions illustrated in FIG. 2. The optical microreactor 101 is arranged between the light source module 201 and the temperature control module 202 as illustrated in FIG. 2 and FIG. 3. A circulating fluid (heat medium) 213 flows into one temperature control module 202, flows out therefrom and then flows into the other temperature control module 202 and flows out therefrom.

As in the example illustrated in FIG. 5, by serially connecting the two microreactor units for photoreactions and introducing a product 501 obtained by the first microreactor for photoreactions 101 into the second microreactor for photoreactions 101, the photoreaction time can be made longer.

As described above, according to the first embodiment of the invention, since a material capable of suppressing light reflection and having high thermal conductivity is used for the flow path plate 104, a reflection light can be suppressed to improve the temperature controllability and improve the reproducibility of the product to be obtained.

Further, since heating of the light source or heating of the system caused by the reflection light can be suppressed by the combination of the light source module 201, the temperature control module 202, and the microreactor for photoreactions 101, the side reactions can be suppressed to improve the yield.

Second Embodiment

Then, a microreactor for photoreactions according to a second embodiment of the invention is to be described.

Figure 6:
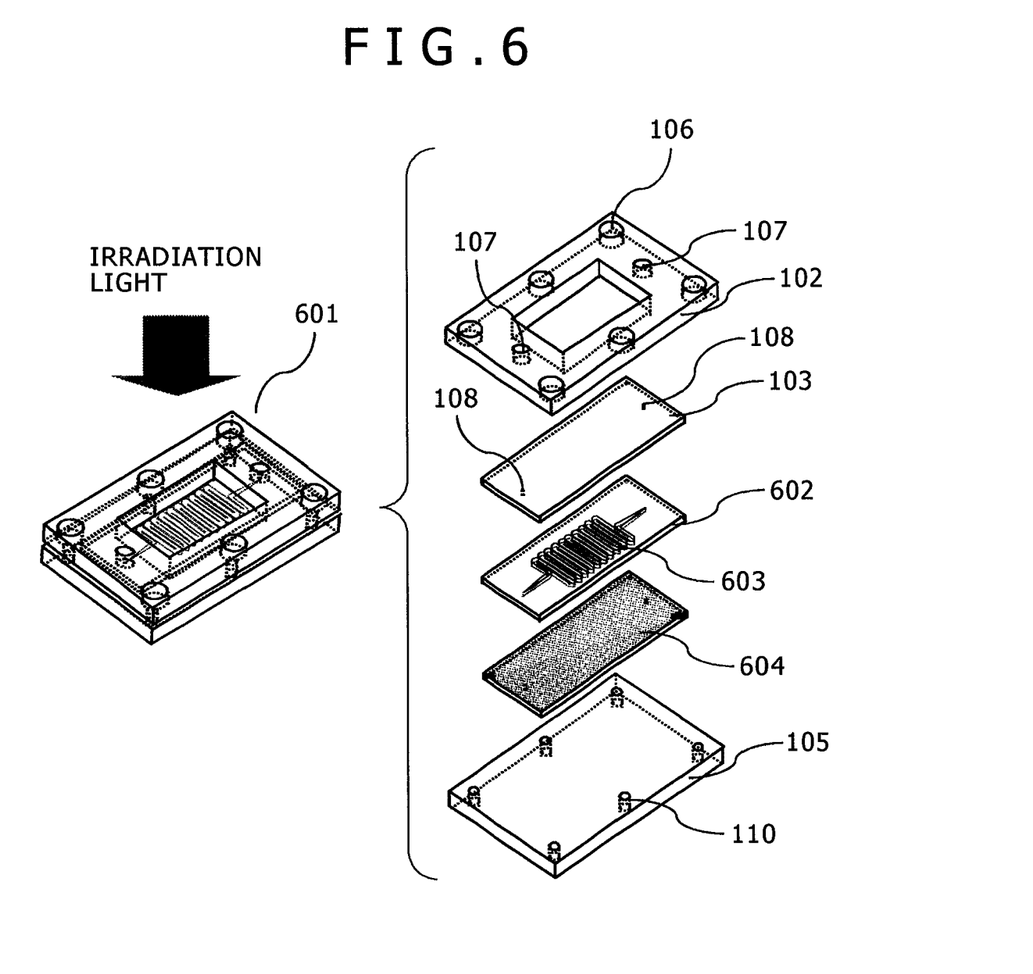
FIG. 6 illustrates an appearance and an exploded perspective view of a microreactor for photoreactions according to a second embodiment of the invention.

FIG. 6 illustrates an appearance and an exploded perspective view of a microreactor for photoreactions according to the second embodiment of the invention.

In FIG. 6, a microreactor for photoreactions 601 has a housing upper part 102, a lid plate 103 made of a material that allows transmission of light, a penetration flow pass plate 602, a bottom plate 604 made of a material that suppresses light reflection and has a high thermal conductivity, and a housing lower part 105.

The first embodiment illustrated in FIG. 1 and the second embodiment illustrated in FIG. 6 are different in that the penetration flow path plate 602 and the bottom plate 604 are disposed in the second embodiment instead of the flow path plate 104 in the first embodiment. The first embodiment and the second embodiment are identical with respect to other configurations.

A penetration flow path plate 602 has a penetration flow path 603 formed therein that penetrates from the upper surface to the bottom of the plate 602, and the lid plate 103, the penetration flow path plate 602, and the bottom plate 604 are welded (secured) to each other. Thus, the lid plate 103, the penetration flow path plate 602, and the bottom plate 604 form an integrated plate in which two fluid gateways 108 and both ends of the penetration flow path 603 are aligned respectively so as to flow the fluid. Both ends of the penetration flow path 603 form a fluid inlet port and a fluid exit port.

A fluid introduced from one fluid gateway 108 of the lid plate 103 flows by way of a flow path defined by the penetration flow path 603 and the bottom plate 604 and is discharged from the other fluid gateway 108.

The size of the penetration flow path plate 602 and the bottom plate 604 in combination can be identical with that of the flow path plate 104 in the first embodiment. Referring to the material, the material of the bottom plate 604 is identical with the material of the flow path plate 104 that suppresses light reflection and has a high thermal conductivity.

Also in the second embodiment of the invention, the same effect as in the first embodiment can be obtained. That is, according to the second embodiment of the invention, since a material suppressing light reflection is used for the bottom plate 604, a reflection light can be suppressed and the reproducibility of the product to be obtained can be improved. Further, since the material of high thermal conductivity is used for the bottom plate 604, the temperature controllability can be improved.

Also in the second embodiment of the invention, the microreactor for photoreactions 601 can be combined with the light source module 201 and the temperature control module 202 to form a microreactor device for photoreactions in the same manner as the example illustrated in FIG. 2 and FIG. 3 in the first embodiment. Further, also in the second embodiment, the microreactors for photoreactions 601 combined with the light source modules 201 and the temperature control modules 202 can be arranged in series as in the example illustrated in FIG. 5.

Third Embodiment

Then, a microreactor for photoreactions according to a third embodiment of the invention is to be described.

Figure 7:
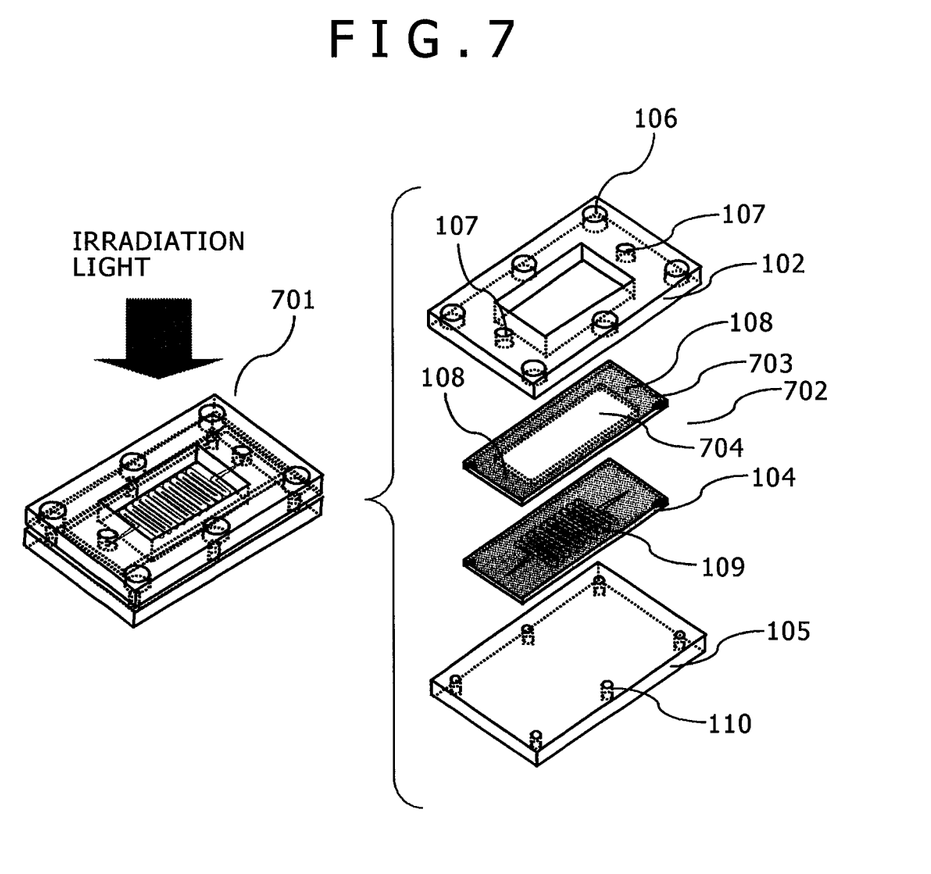
FIG. 7 illustrates an appearance and an exploded perspective view of a microreactor for photoreactions according to a third embodiment of the invention.

FIG. 7 illustrates an appearance and an exploded perspective view of a microreactor for photoreactions according to the third embodiment of the invention.

In FIG. 7, a microreactor for photoreactions 701 has a housing upper part 102, a lid plate 702, a flow path plate 104 made of a material that suppresses light reflection and has a high thermal conductivity, and a housing lower part 105.

The first embodiment illustrated in FIG. 1 and the third embodiment illustrated in FIG. 7 are different in that a window frame part 703 made of a material suppressing light reflection and having high thermal conductivity, and a light transmitting part 704 allowing transmission of light are formed in the second embodiment instead of the lid plate 103 in the first embodiment. The first embodiment and the third embodiment are identical with respect to other configurations.

The lid plate 702 and the flow path plate 104 are welded to each other to form an integrated plate in which two fluid gateways 108 and both ends of the flow path 109 are aligned respectively so as to flow a fluid. A fluid introduced from one gateway 108 flows through the flow path 109 and is discharged from the other gateway 108.

Also in the third embodiment of the invention, the same effect as that in the first embodiment can be obtained. That is, according to the third embodiment of the invention, since the lid plate 702 is configured so as to have a window frame part 703 made of a material that suppresses light reflection and has a high thermal conductivity and a light transmitting part 704 made of a material that allows transmission of light, only the portion of the flow path 109 of the flow path plate 104 is irradiated by light. The light in other portions is absorbed by the window frame part 703 made of a material that suppresses light reflection on the lid plate 702 and has a high thermal conductivity.

Accordingly, temperature increase caused by light absorption can be dispersed to the lid plate 702 and the flow path plate 104 and the temperature controllability can be improved further.

Also in the third embodiment of the invention, the microreactor for photoreactions 601 can be combined with the light source module 201 and the temperature control module 202 into a microreactor device for photoreactions in the same manner as in the first embodiment. Further, also in the third embodiment, the microreactor for photoreactions 601 combined with the light source module 201 and the temperature control module 202 can be arranged serially as in the example illustrated in FIG. 5.

Further, the material of the window frame part 703 can be identical with the material of the flow path plate 104.

As has been described above, since the material suppressing light reflection is used for the flow path plate 104 also in this embodiment, the reflection light can be suppressed and the reproducibility of the product to be obtained can be improved. Further, since a material having high thermal conductivity is used for the flow path plate 104, temperature controllability can be improved.

DESCRIPTION OF REFERENCE NUMERALS 101 microreactor for photoreactions
102 housing upper part
103 lid plate
104 flow path plate
105 housing lower part
106 threaded hole
107 tube connection part (fluid inlet part, fluid exit part)
108 fluid gateway
109 flow path
110 threaded hole
201 light source module
202 temperature control module
203 heat insulation material case
204 power supply part
205 pin
206 substrate
207 light source
208 tube lead out port (fluid inlet port, fluid exit port)
209 heat insulation material case
210 heat conduction plate
211 circulating fluid circulation part
212 circulating fluid gateway
213 circulating fluid (heat medium)
301 raw material(s) (reactant(s))
302 product,
401 microreactor system for photoreactions
402 first raw material (reactant)
403 second raw material (reactant)
404 microreactor for mixing
405 connection tube
406 product
501 product
601 microreactor for photoreactions
602 penetration flow path plate
603 penetration flow path
604 bottom plate
701 microreactor for photoreactions
702 lid plate
703 window frame part
704 light transmitting part

The invention claimed is:

1. A microreactor for a photoreaction of one or more reactants, comprising:
a penetration flow path plate on which a flow path for passing the reactants is formed, and the penetration flow path plate is a light transmitting material; and
a bottom plate secured to the penetration flow path plate, wherein the flow path is disposed to penetrate the penetration flow plate, wherein the bottom plate is made of a material having a high thermal conductivity and suppressing light reflection,
wherein a light reflectance of the bottom plate is 5.1% to 15.3% at a wavelength of light of 240 to 2600 nm, and
wherein the thermal conductivity of the bottom plate is 31.2 W/(m·K).

2. The microreactor according to claim 1, further comprising:
a lid plate which is a light transmitting material, and is secured with the flow path plate where a fluid inlet and a fluid exit of the lid plate correspond to a fluid inlet and a fluid exit of the flow path plate.

3. The microreactor according to claim 2, further comprising:
a housing upper part and a housing lower part which fix the lid plate, the penetration flow path plate, and the bottom plate therebetween,
wherein the housing upper part includes a fluid inlet and a fluid exit at positions corresponding to the fluid inlet and the fluid exit of the lid plate.

4. A microreactor device for photoreactions comprising:
one or more microreactor units, each of the microreactor units including a microreactor which has:
a penetration flow path plate on which a flow path for passing the reactants is formed, the penetration flow path plate is a light transmitting material, and the flow path is disposed to penetrate the penetration flow plate,
a bottom plate secured to the penetration flow path plate, wherein the bottom plate is made of a material having a high thermal conductivity and suppressing light reflection, wherein the bottom plate has a light reflectance of 5.1% to 15.3% at a wavelength of light of 240 to 2600 nm, and wherein the thermal conductivity is 31.2 W/(m·K),
a lid plate which is a light transmitting material, and is secured with the flow path plate where a fluid inlet and a fluid exit of the lid plate correspond to a fluid inlet and a fluid exit of the flow path plate, and
a housing upper part and a housing lower part which fix the lid plate, the penetration flow path plate, and the bottom plate therebetween, where the housing upper part includes a fluid inlet and a fluid exit at positions corresponding to the fluid inlet and the fluid exit of the lid plate;
a light source to irradiate the microreactor with light; and
a temperature control module in which the microreactor is accommodated, where the temperature control module includes a circulating fluid circulation part, a fluid inlet for introducing a fluid to the fluid inlet of the housing upper part, and a fluid exit for exiting the fluid from the fluid exit of the housing upper part.

5. The microreactor according to claim 4,
wherein the microreactor units include a first microreactor unit connected in series to a second microreactor unit, and the fluid introduced from the fluid inlet and exited from the fluid exit of the temperature control module of the first microreactor unit is introduced to the fluid inlet and exited from the fluid exit of the temperature control module of the second microreactor unit.

* * * * *